C. A. McCUTCHEON.
FLEXIBLE SHAFT COUPLING.
APPLICATION FILED JUNE 21, 1917.
1,320,786.
Patented Nov. 4, 1919.
2 SHEETS—SHEET 1.
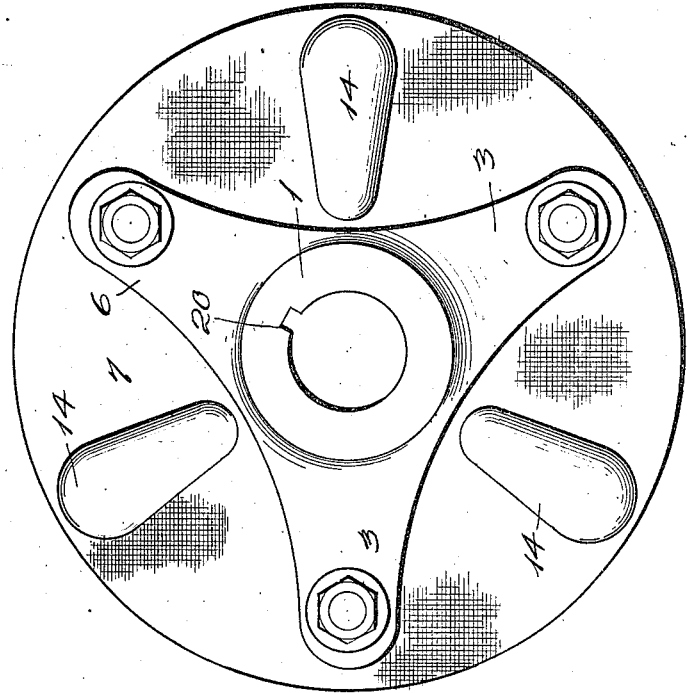
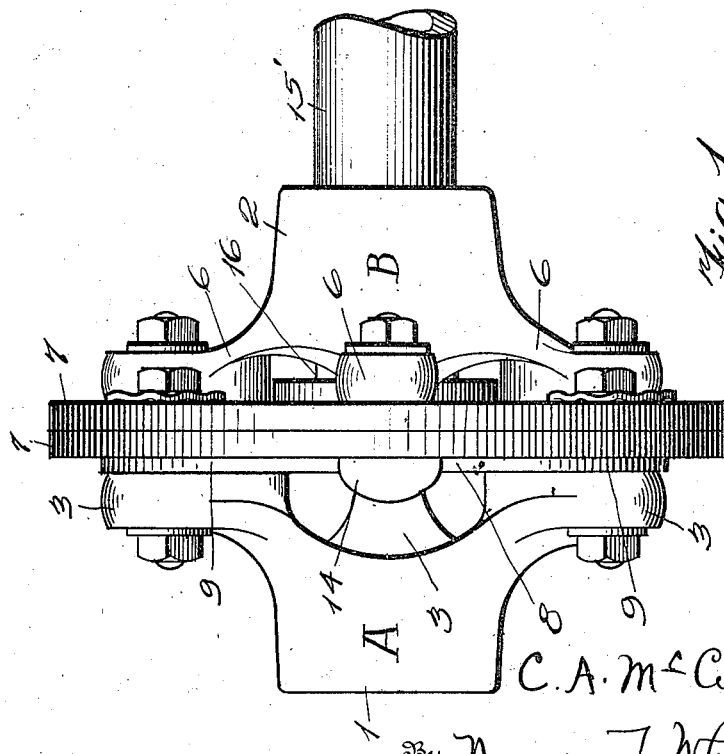
Inventor
C. A. McCutcheon
By Norman T. Whitaker
his Attorney C. A. McCUTCHEON.
FLEXIBLE SHAFT COUPLING.
APPLICATION FILED JUNE 21, 1917.
1,320,786.
Patented Nov. 4, 1919.
2 SHEETS—SHEET 2.
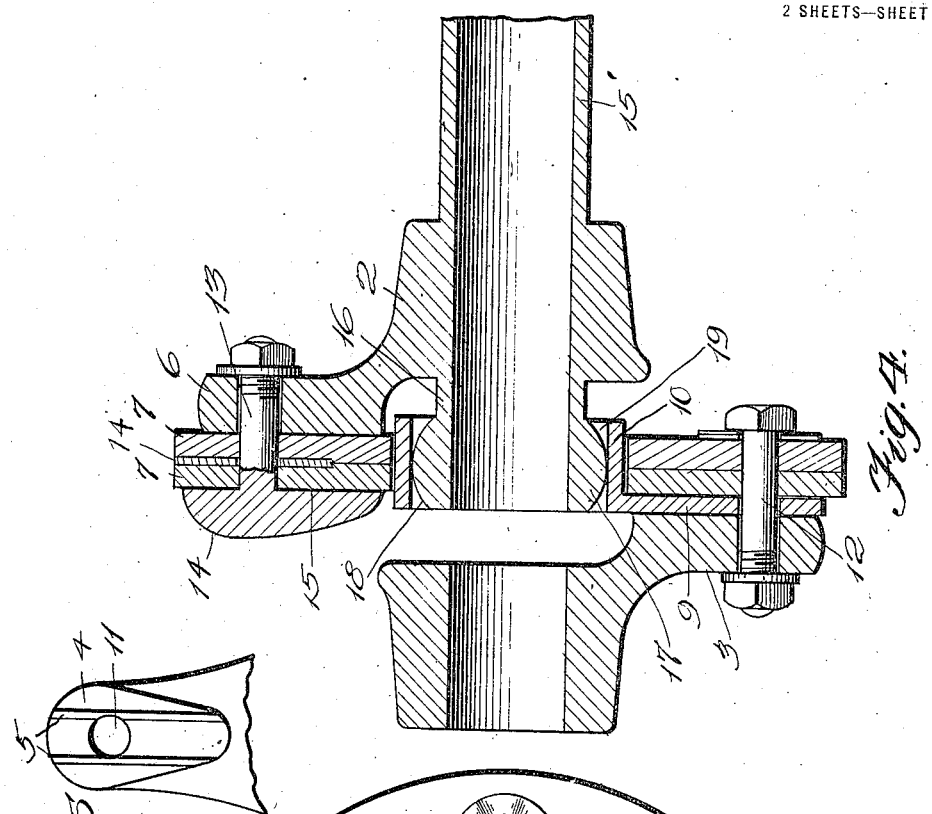
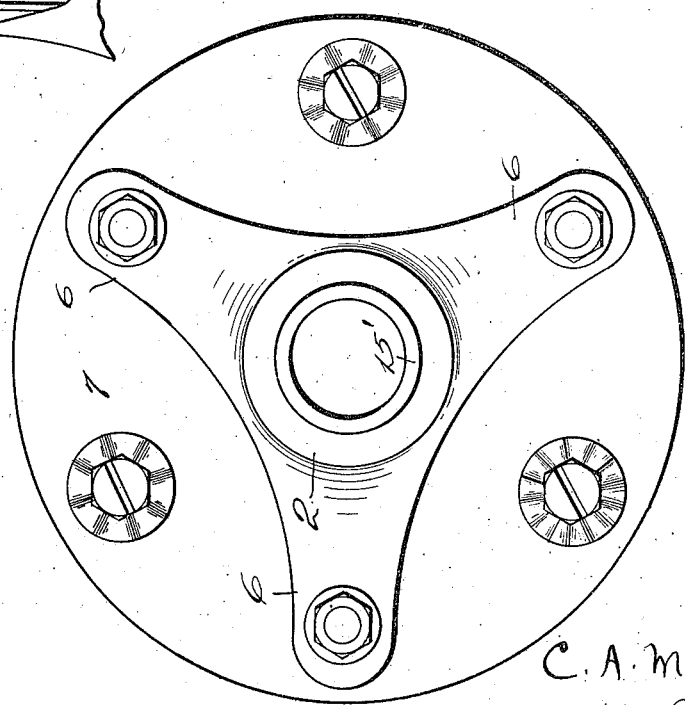

UNITED STATES PATENT OFFICE.

CHARLES A. McCUTCHEON, OF FALCONER, NEW YORK.

FLEXIBLE SHAFT-COUPLING.

1,320,786.     Specification of Letters Patent.     Patented Nov. 4, 1919.

Application filed June 21, 1917. Serial No. 176,192.

*To all whom it may concern:*

Be it known that I, CHARLES A. MC-CUTCHEON, a citizen of the United States, and resident of Falconer, in the county of Chautauqua and State of New York, have invented new and useful Improvements in Flexible Shaft-Couplings, of which the following is a specification.

This invention relates to flexible shaft couplings, and has particular reference to the class of flexible couplings which is employed in the use and construction of automobiles.

The primary object is to provide a means for positively connecting two shafts, one of which may be a driven shaft and the other a drive shaft, whereby one shaft may be permitted to assume a position out of alinement with respect to the other shaft, but at the same time a positive connection between the two shafts will be sustained.

Another object is to provide a flexible shaft coupling, adapted to be interposed between the ends of the driven shaft and a drive shaft, which will not only permit the driven shaft to assume a position out of alinement with respect to the drive shaft, but will also permit the driven shaft, when out of alinement, to be rotated at a constant and even rate of speed with respect to that of the drive shaft.

A further object is to provide in a flexible shaft coupling, a means whereby a shock, incident to the sudden starting of the driving shaft or to the sudden stopping of the driven shaft, would be absorbed to an appreciable degree, thereby not only relieving the coupling itself from undue strain, but also such other mechanism as may be connected, either directly or indirectly, thereto.

With the above and other objects in view, the present invention consists in the combination and arrangement of parts hereinafter more fully described, illustrated in the accompanying drawings, and particularly pointed out in the appended claim, it being understood that changes may be made in the form, proportion, size, and minor details without departing from the spirit or sacrificing any of the advantages of the invention.

In the accompanying drawings:—

Figure 1 is a side elevation of the invention,

Fig. 2 is a face view of the end which is adapted for the reception of the driven shaft, Fig. 3 is a face view of the end which is adapted for the reception of a driving shaft, Fig. 4 is a longitudinal sectional view of Fig. 1, and Fig. 5 is an enlarged view of the inner face of a radial arm at its outer end.

Now referring more particularly to the drawings, the reference characters A and B indicate coupling members, each being provided with a hub 1 and 2 respectively. The hub 1 is provided with radially extending fingers 3 equidistantly spaced with respect to each other, and provided with elongated bearing faces 4 at their outer ends as shown in Fig. 5. These faces 4 are provided with ribs 5 arranged parallel with respect to each other and longitudinally with respect to the elongated faces 4. The hub 2 of member B, like the hub 1 of member A, is provided with radially extending fingers 6 equidistantly spaced with respect to each other and provided with elongated bearing faces as indicated by the numeral 4, and having disposed thereupon ribs arranged parallel with respect to each other and longitudinally with respect to the bearing faces as indicated by numerals 5—5 of Fig. 5. The fingers 3 of the hub A are arranged to alternate with the fingers 6 of the hub B.

Disposed between the two coupling members A and B is a plurality of flexible rings 7—7. I prefer to construct these rings 7—7 of heavy woven material and impregnate the same with vulcanized rubber, thereby forming a ring which will not only possess toughness but also a high degree of flexibility. I wish it understood, however, that these rings may be formed of any other suitable and desired material.

A spider 8 is disposed between the flexible rings 7—7 and the coupling member A. The spider is provided with equidistantly spaced arms 9, each of which is disposed directly between the flexible rings 7—7 and a radial finger 3 of the connecting member A. The spider 8 is centrally provided with a flange 10 adapted to serve for a purpose as will hereinafter be explained in this specification.

The flexible rings 7—7 together with the arms 9 of the spider 8 are secured to the fingers 3 of the connecting member A by means of bolts 12 in the manner as indicated in Fig. 4. The flexible rings 7—7 are secured to the radial fingers 6 of the connecting member B by means of a clamp 13, one end of which is provided with an elongated head 14, having formed on its inner side a shoulder 15 approximately the same length as the face 4 of the finger 6 through which the clamp 13 is passed. By providing broad bearing surfaces between the radial fingers 6, the flexible rings 7—7 and the head 14 of the clamp 13, there is created a tendency to evenly distribute the strain of rotation throughout the flexible rings 7—7 when power is applied to the driving end of the coupling.

In order to further strengthen the flexible rings 7—7, when under the strain of rotation, I have embedded into and between the flexible rings 7—7 reinforcing washers 14' through which is passed the clamp 13.

The hub 2 of the connecting member B is provided at its outer end with an elongated sleeve 15' adapted to receive a driving shaft (not shown) which may be fastened therein by any suitable and desired means. The inner side of the hub 2 is provided with a guide 16 which serves not only as a means for centering the members, A and B with respect to each other when they are being joined together, but also as an auxiliary support. The guide 16 has formed at its inner end an enlarged portion 17 provided with a spherical bearing surface 18 adapted to movably engage the inner wall 19 of the flange 10 carried by the spider 8. The hub 1 of the connecting member A is adapted to receive a driven shaft (not shown) and is provided with a key-way 20 adapted to receive a key (not shown) by which the driven shaft may be secured in the conventional manner.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, what I claim as new and desire to secure by Letters Patent is:—

A flexible coupling comprising coupling members, each coupling member including a hub and a plurality of radial fingers extending therefrom, each having an elongated inner face provided with a plurality of ribs extending longitudinally thereto, the fingers of one member being arranged to alternate with the fingers of the other member; a plurality of flexible rings disposed between said coupling members; a plurality of spacing washers disposed between said rings; a plurality of bolts, each having an elongated head provided with a face carrying a plurality of ribs extending longitudinally thereon, said bolts being adapted to connect said rings with the fingers of one of said couplings and passed through said reinforcing washers; a spider having a plurality of radial extending arms, said spider being disposed between said flexible rings and one of said coupling members; and a plurality of bolts connecting the flexible rings, with the arms of one of said coupling members, said bolts passing through the arms of said spider.

CHARLES A. McCUTCHEON.